Dec. 27, 1927.

P. C. GRAHAM 1,654,043

TRIP GATE FOR CHUTES OR THE LIKE

Filed Nov. 23, 1926

INVENTOR.
PAUL C. GRAHAM.
BY.

ATTORNEY.

Patented Dec. 27, 1927.

1,654,043

UNITED STATES PATENT OFFICE.

PAUL C. GRAHAM, OF LONG BEACH, CALIFORNIA, ASSIGNOR OF ONE-HALF TO HENRY OLIVER CHILDRETH, OF LONG BEACH, CALIFORNIA.

TRIP GATE FOR CHUTES OR THE LIKE.

Application filed November 23, 1926. Serial No. 150,273.

An object of my invention is to provide a trip gate in a chute supplying material such as rock which may be easily and quickly tripped to open or close, by one man.

Another object of my invention is to provide a gate which is opened or closed by the action of the material in the chute.

A further object is to provide a gate of the character stated which is particularly adapted for use as a feeder gate in which a suitable timing device will open or close the gate at regular intervals.

Other objects, advantages, and features of invention may appear from the accompanying drawing, the subjoined detailed description and the appended claims.

In the drawing—

Figure 1:
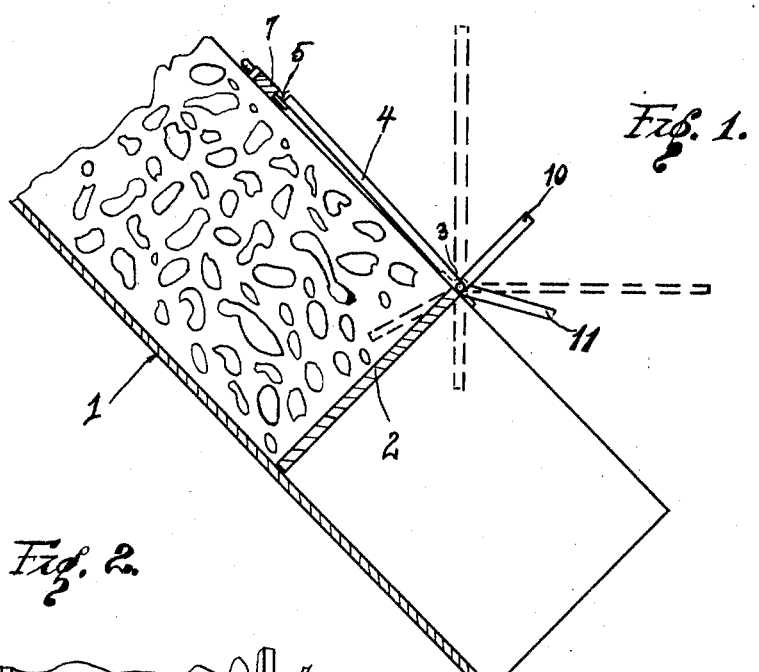
Fig. 1 is a longitudinal sectional view of my gate in position in a chute.
Figure 2:
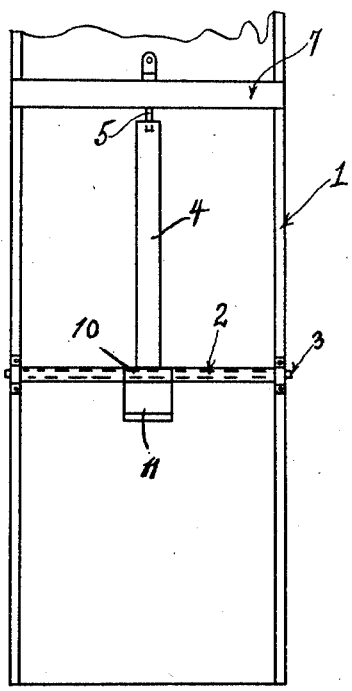
Fig. 2 is a plan view of the same.
Figure 3:
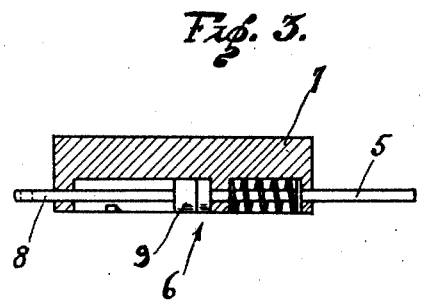
Fig. 3 is an enlarged longitudinal sectional view of the gate tripping device.

Referring more particularly to the drawing:

My gate is particularly adapted to be used in connection with an inclined chute 1 through which material such as rock, sand or the like is fed. The gate 2 is pivoted at its upper end by a rod 3 or the like extending therethrough, said rod being suitably journaled on the top of the side walls of the chute.

A trip arm 4 is secured to the upper end of the gate 2 and extends at right angles to said gate, said trip arm being adapted to rest on the trigger 5 of the tripping mechanism 6. This trip mechanism is adapted to be mounted on a cross member 7 extending between the side walls of the chute 1 and is adapted to be operated through a suitable rope lever or the like, (not shown) which may be operated by the man loading the truck or the like. This trip mechanism may be of any desirable type. I do not wish to limit myself to any specific mechanism.

As shown in the drawing, the trigger 5 is coupled to the finger 8 by a suitable latch 9, which latch is released after the trigger has been withdrawn sufficiently to release the trip arm 4. When the trip mechanism 6 is released the weight of the material against the gate 2 causes the gate to swing outwardly, drawing the trip arm 4 downwardly into the flow of material, and thus assisting the rotation of the gate 2.

Paddles 10 and 11 extend at an angle from the gate 2 and are adapted to be successively acted upon by the material to further rotate the gate 2 until said gate reaches a position of rest against the trigger 5. In this last named position of the gate, the chute is opened and the material flows freely therethrough. When it is desired to close the chute the trigger 5 is again released and the weight of the gate 2 will carry it downwardly into the moving stream of material and will be acted upon by said material, causing said gate to rotate until the trip arm 4 engages the trigger 5, at which time the gate is in position shown in Fig. 1, and the chute is closed.

It will be evident from the foregoing description that the gate may be quickly and easily operated by one man who simply releases the trigger 5 through suitable cables or levers. By providing a timing mechanism for the trigger 5 the gate 2 can be operated at regular intervals to permit material to be fed in specified quantities to a mixer or other device.

Having described my invention, I claim:

1. A trip gate for chutes or the like comprising a pivotally mounted gate, a trip arm on said gate, and trip means adapted to engage said arm to hold the gate in closed position, said trip means being also adapted to hold the gate in open position, and paddles extending at an angle from said gate, said paddles being adapted to engage the stream of material to assist in rotating the gate.

2. A trip gate for chutes or the like comprising a pivotally mounted gate, a trip arm extending at right angles from said gate, trip means adapted to engage said arm, a cross member upon which said trip means is mounted, paddles extending at an angle from said gate, said paddles being adapted to engage the stream of moving material to assist in rotating the gate, and said trip means being adapted to engage and hold the gate in open position.

In testimony whereof, I affix my signature.

PAUL C. GRAHAM.